Figure 2:
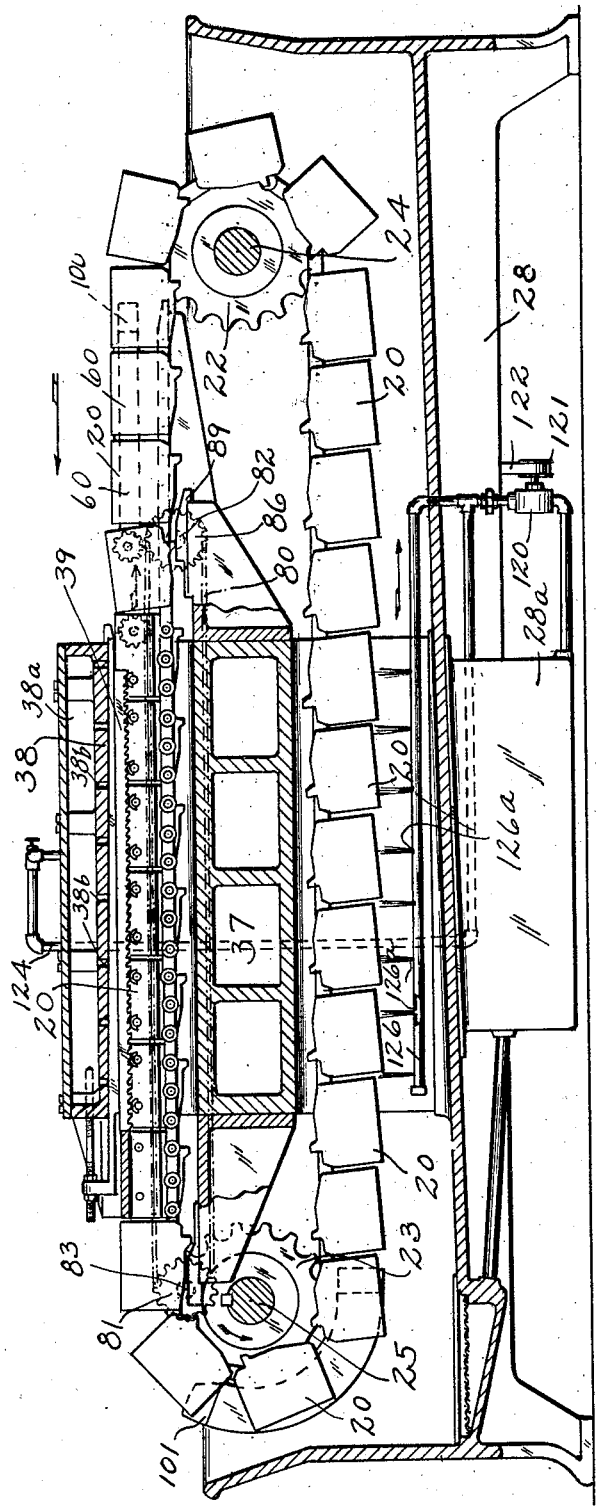

Dec. 15, 1936.                B. P. SCHILTZ                2,063,955
                    APPARATUS FOR MACHINING METAL PARTS
                      Filed Nov. 9, 1932         6 Sheets-Sheet 1
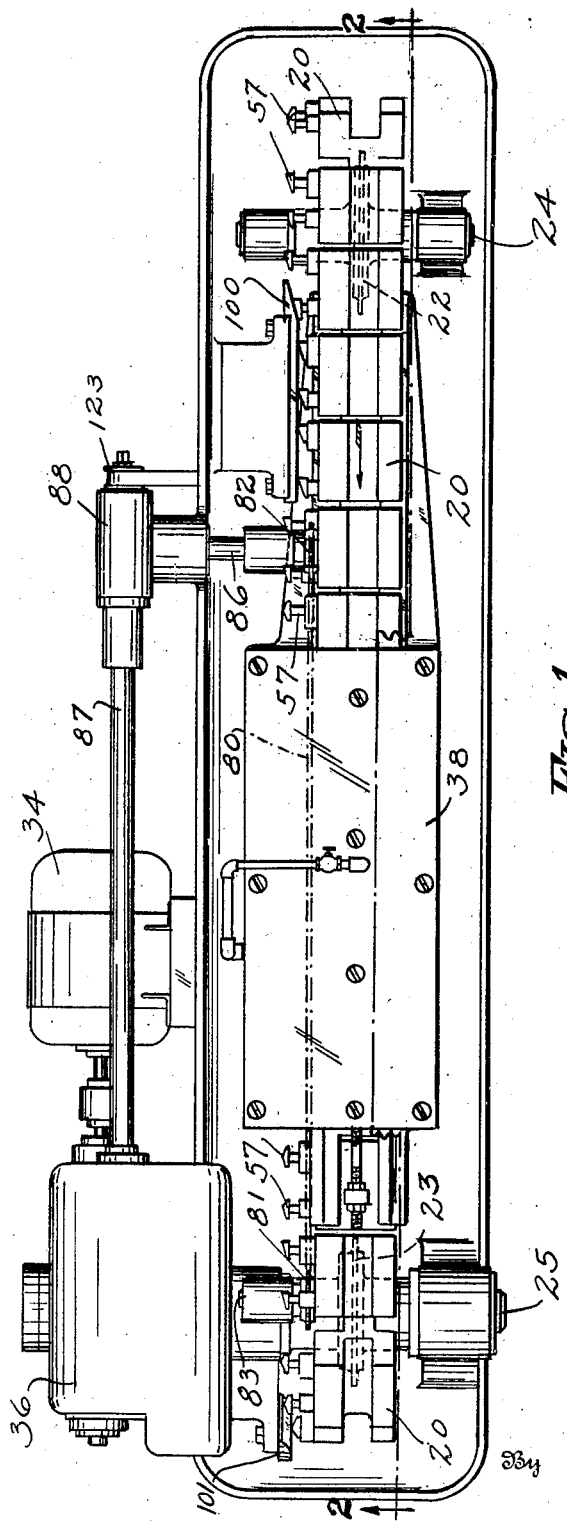
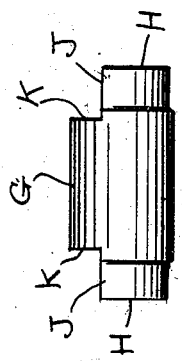
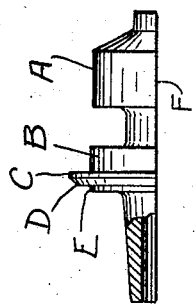
Inventor
Bernard P. Schiltz
By Bates Golrick & Pease
Attorneys Dec. 15, 1936. B. P. SCHILTZ 2,063,955
APPARATUS FOR MACHINING METAL PARTS
Filed Nov. 9, 1932 6 Sheets-Sheet 2

Inventor
Bernard P Schiltz
By Bates Goldrick & Teare
Attorneys

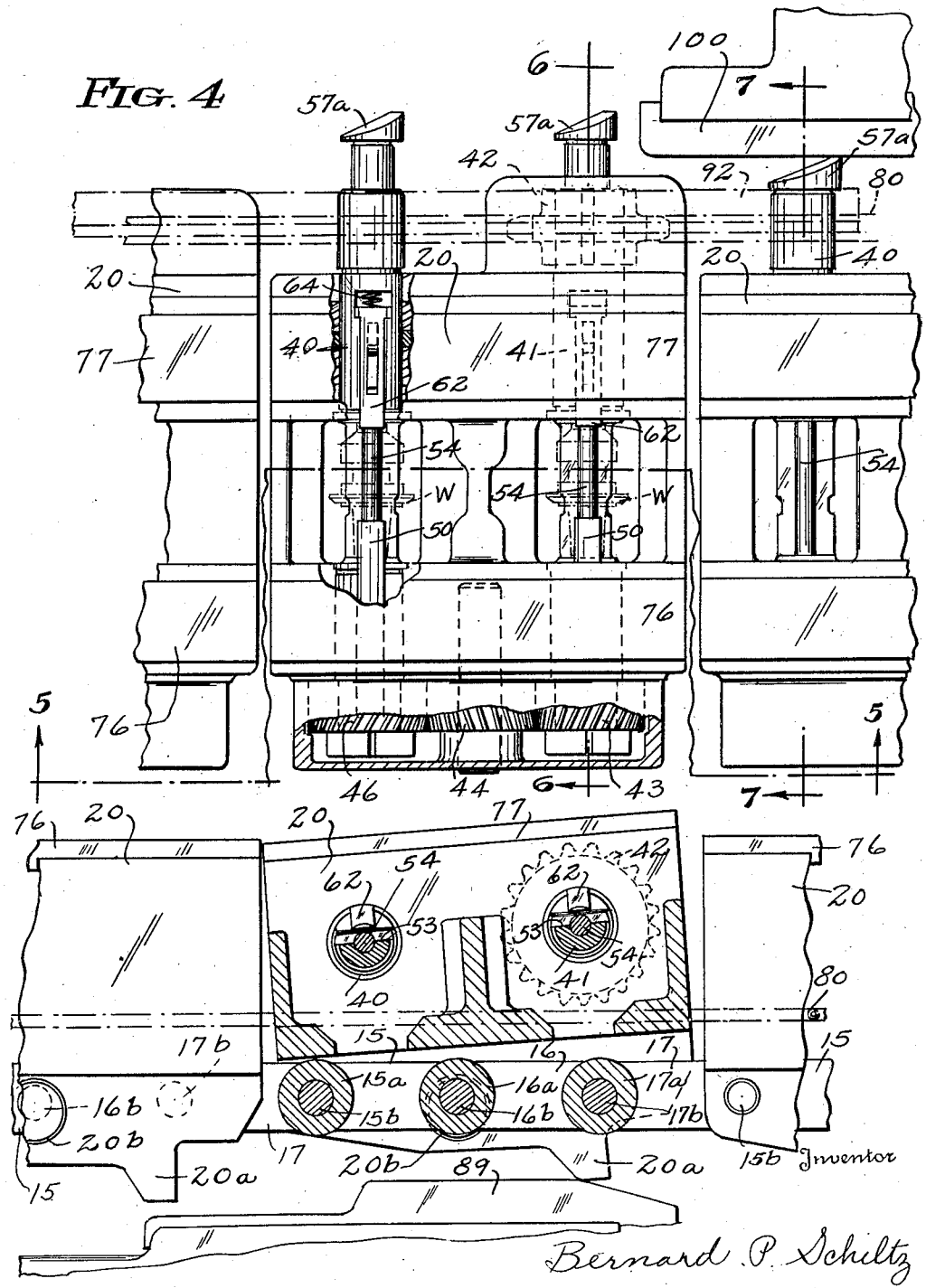

Dec. 15, 1936.  B. P. SCHILTZ  2,063,955
APPARATUS FOR MACHINING METAL PARTS
Filed Nov. 9, 1932   6 Sheets-Sheet 4

Inventor
Bernard P. Schiltz
By Bates Goldrick & Teare
Attorneys

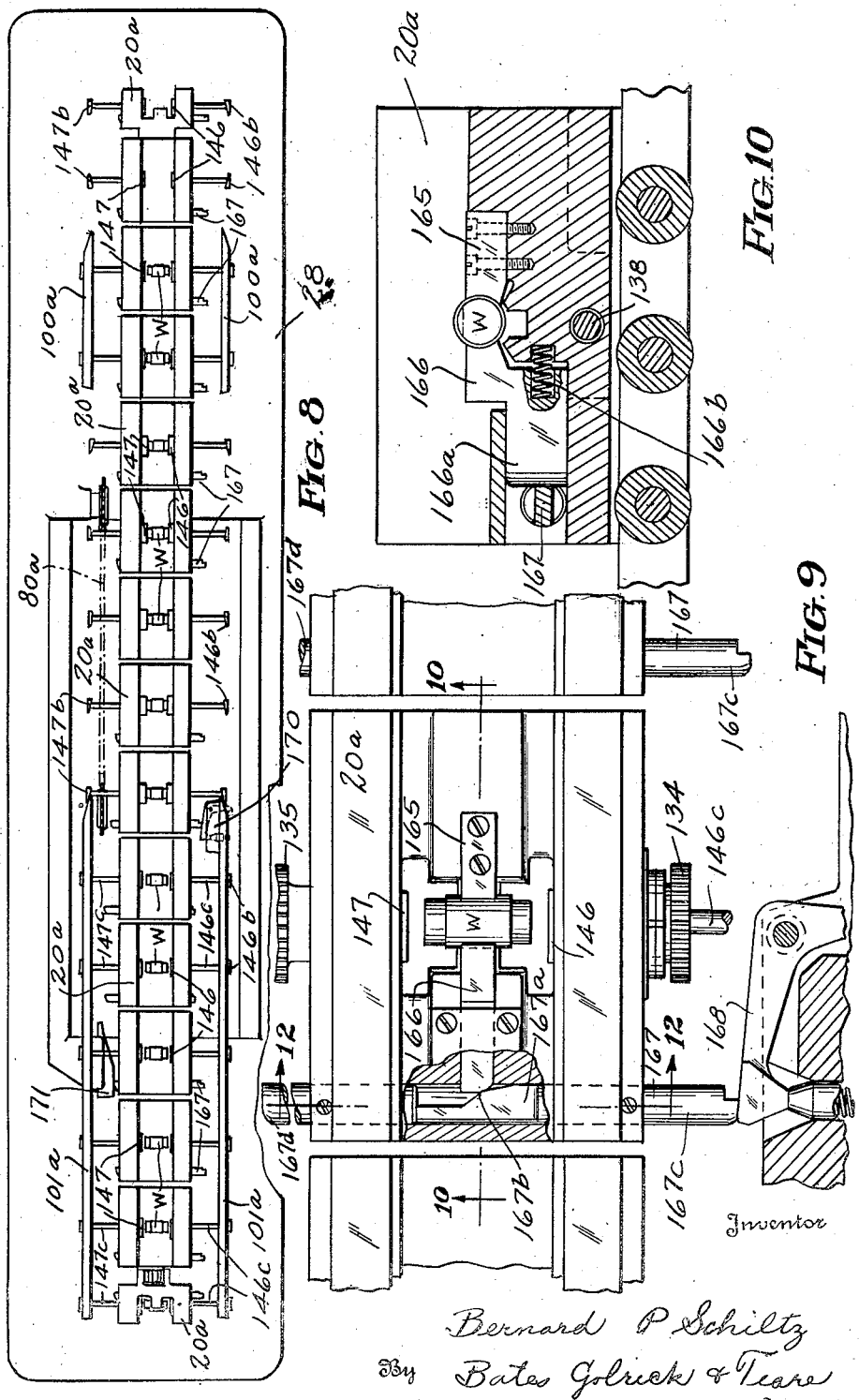

Dec. 15, 1936.   B. P. SCHILTZ   2,063,955
APPARATUS FOR MACHINING METAL PARTS
Filed Nov. 9, 1932   6 Sheets-Sheet 6

Inventor
Bernard P. Schiltz
By Bates Golrick & Teare
Attorneys

Patented Dec. 15, 1936

2,063,955

UNITED STATES PATENT OFFICE 2,063,955

APPARATUS FOR MACHINING METAL PARTS

Bernard P. Schiltz, Cleveland, Ohio, assignor to The Foote Burt Company, Cleveland, Ohio, a corporation of Ohio Application November 9, 1932, Serial No. 641,851

20 Claims. (Cl. 29—33)

The general object of the present invention is the provision of a novel apparatus for effecting the machining of flat and turned surfaces on a piece of work, by imparting to the work a linear movement which carries the work piece past the cuttting edges of stationary fixed tools.

Another object of my invention is the provision of an apparatus which is adapted to the effecting of the rapid surface finishing of pieces of metal work having flat and turned surfaces in an accurate precision manner.

A still further object of my invention is the provision of an endless chain type of machine tool and having a plurality of work-carrying fixtures adapted to carry the work in a common linear direction past a plurality of tools whereby flat and turned surfaces may be effected upon the work pieces while being carried by the fixtures.

A still further object of my invention is the provision of an apparatus which will have comparatively high production capacity and which will economically machine flat and turned surfaces in a continuous manner upon a plurality of pieces of work.

Other objects of my invention will hereinafter become apparent from the following description, which refers to the accompanying drawings. The essential characteristics thereof are summarized in the claims.

My invention contemplates economical machining of work pieces which have flat surfaces and turned surfaces, the flat surfaces and turned surfaces being precisionally related and I effect the finishing of such work pieces by moving the work pieces along a definite plane extending parallel to the cutting faces of fixed stationary multiple cutting-edge tools. During the cutting operation of effecting the flat surface finish, the work, while being linearly moved, is not rotated, while during the turning cuts the work is both linearly moved and rotated, and my method can be accomplished by effecting the turning cut first and the flat cut second, or vice versa, depending upon the shape of the work and the general contour and precision relation of the straight or flat cuts and the turned cuts.

In the drawings I show two embodiments of my invention. In the first instance, the apparatus for carrying out my method is adapted only to the effecting of a turning cut upon a piece of work, which piece of work has previously been flat finished in an endless chain broach machine of the type such as is described and disclosed in the copending application of Edward E. Nyegren, Serial No. 592,574, and which is assigned to my assignee the second form of my apparatus, as disclosed in the present drawings, is adapted to effect a turning cut and a flat or straight line cut upon the piece of work while the work passes through one machine.

Figure 6:
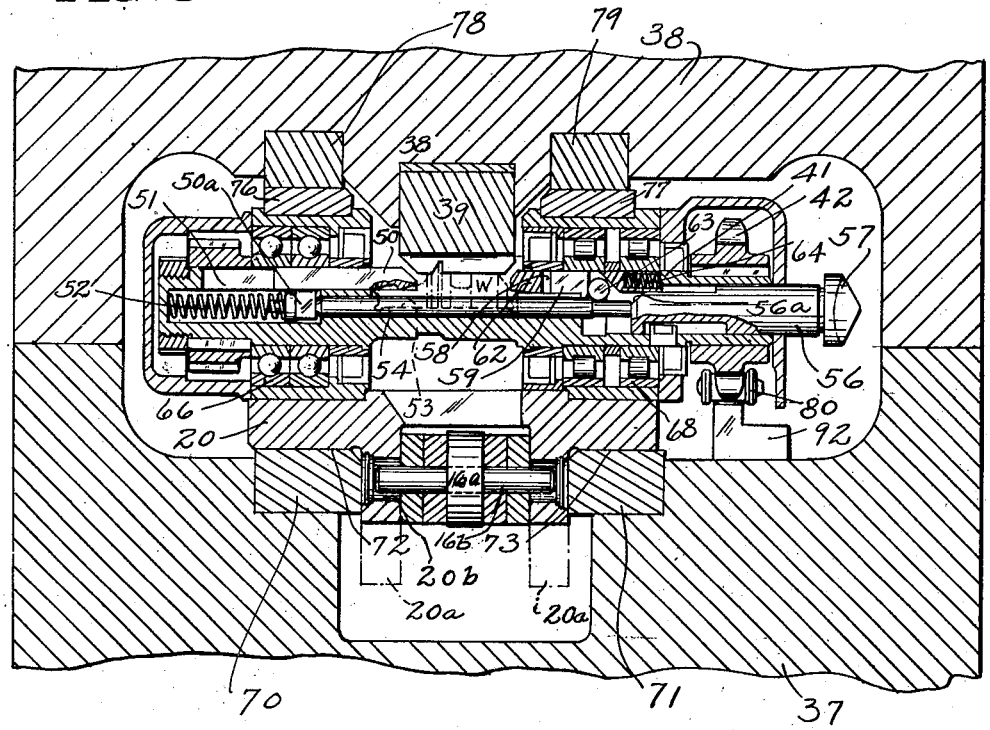
Figure 7:
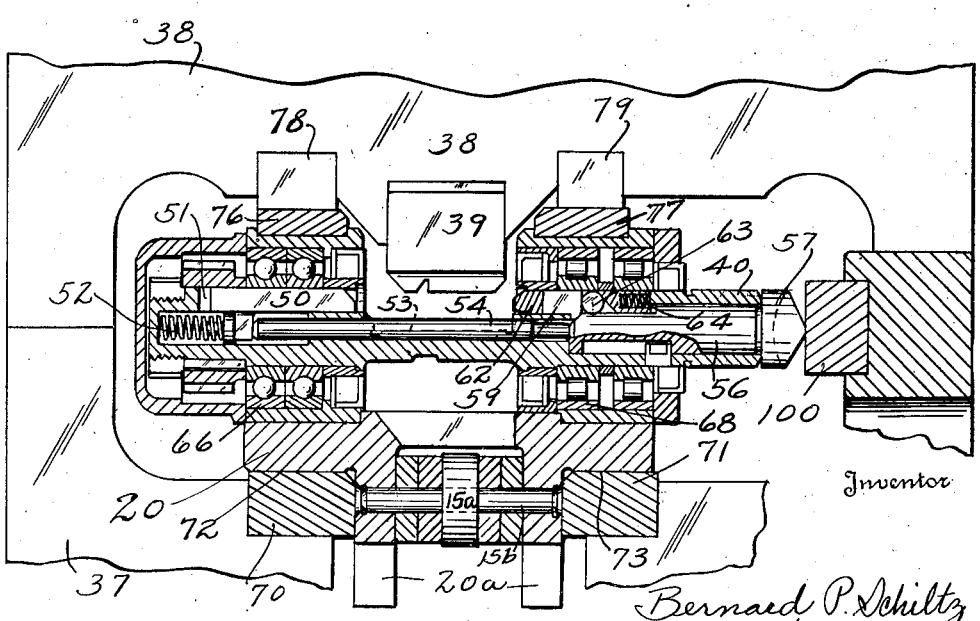
Figure 11:
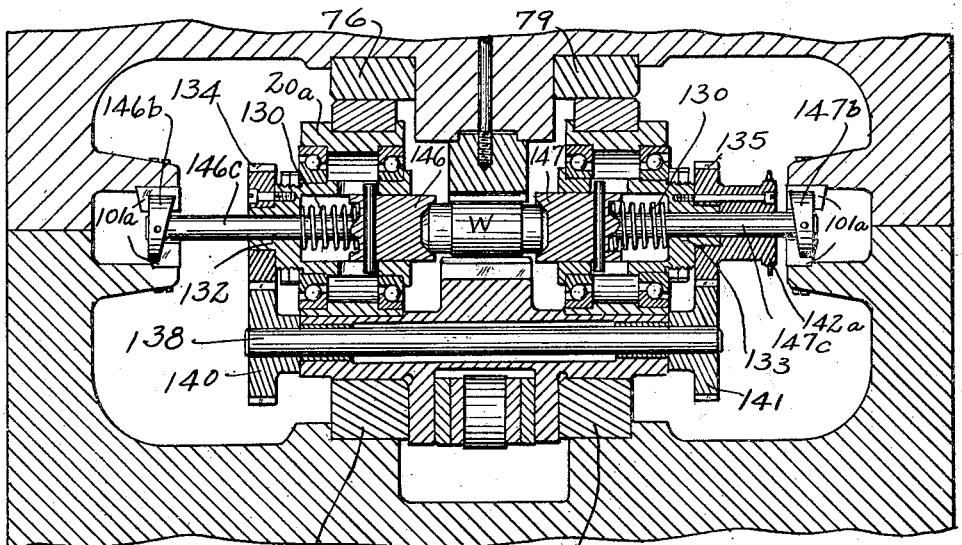
Figure 12:
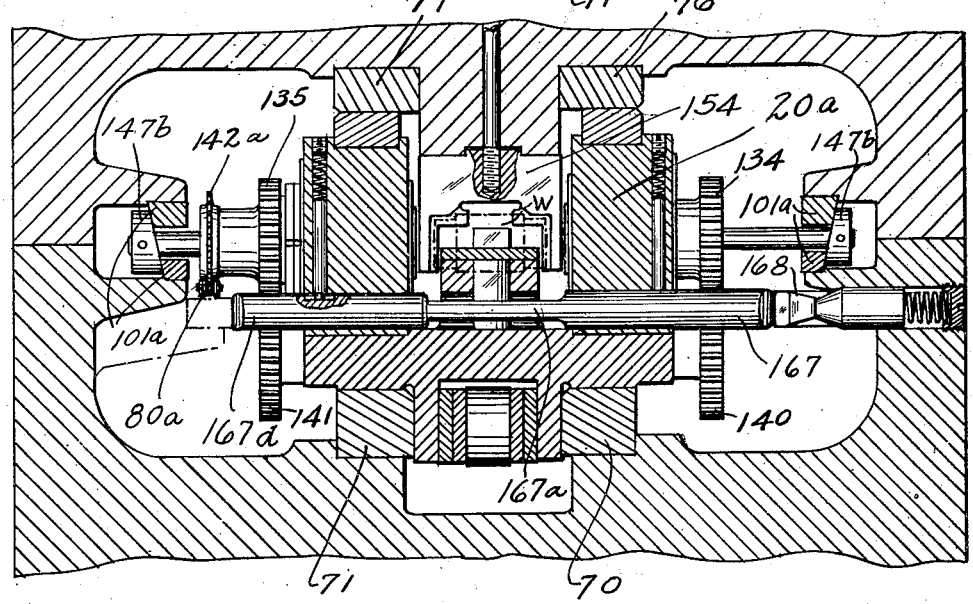

The illustrations in the drawings comprise in Fig. 1 the embodiment of my novel apparatus in an endless chain type of machine, Fig. 1 being a plan view. Fig. 2 is a longitudinal cross-sectional side elevation of the machine taken substantially along the plane indicated by the lines 2—2 of Fig. 1; Fig. 3 is a view of a work piece having both flat surfaces and round surfaces formed thereon by my method; Fig. 4 is an enlarged plan view of a fixture comprising one of a plurality of fixtures connected in endless chain fashion in the machine and adapted to receive two work pieces and subsequently revolve the work pieces as the work pieces are passed by a tool or tools; Fig. 5 is a cross-sectional view taken along a zigzag plane, as indicated by lines 5—5 of Fig. 4; Fig. 6 is a transverse section taken through the fixture, substantially along the lines 6—6 of Fig. 4, while Fig. 7 is a similar cross-sectional view taken along the line 7—7 of Fig. 4; Fig. 8 is a plan view of a series of fixtures arranged in endless chain fashion and adapted to operate in the machine shown in Figs. 1 and 2, the fixtures being of a modified form to present the work to the tools for both straight line and rotary cuts; Fig. 9 is an enlarged plan view of the fixture, similar to Fig. 4, but modified to adapt the fixture for presenting the work for both straight line and rotary cuts; Fig. 10 is a longitudinal cross-sectional view taken substantially along the lines 10—10 of Fig. 9; Fig. 11 is a cross-sectional view taken through the fixture and similar to the view shown in Fig. 6, but taken through the modified form of fixture, along the line 11—11 of Fig. 10;

Fig. 12 is a view of the modified fixture, and similar to Fig. 7, but modified for both straight cut and turning operations; Fig. 13 is a perspective view of a work piece, showing both flat and turned surfaces formed thereon by the use of the machine shown in Figs. 1 and 2, when equipped with the modified form of fixtures shown in Figs. 9 to 12, inclusive.

In Figs. 8 to 12, respectively of the drawings, I show a modified adaptation of my apparatus to substantially the same machine frame and attendant mechanism illustrated in Figs. 1 and 2, but the fixture mechanism is modified somewhat whereby I may effect a turning cut operation upon the work, as well as a straight-line cut, and for the purpose of simplifying the illustration I show each fixture as being provided with only one spindle, which serves to clamp the ends of the rough work pieces and rotate the work pieces to effect a cylindrical machining operation thereon, prior to the effecting of any straight line cuts. This fixture mechanism is provided with a set of clamps mechanically independent of the turning cut or spindle clamps and which serve to grip part of the finished cylindrical surface of the work in such manner that the ends and other portions of the work may be exposed for presentation of the work to cutting tools to effect straight line cuts on the ends of the work and on the top thereof. Such a piece of work is illustrated in Fig. 13, the cylindrical surface G having been finished first and thereafter the end surfaces H and notch-forming surfaces J and K were machined, in the work-traversing movement of the fixture through the machine.

In the drawings, Figs. 1 to 10, inclusive, illustrate the machine and fixtures as being adapted to receive the work piece shown in Fig. 3, and effect thereon turning cuts on circular surfaces, A, B, C, D, E; the flat surface F having been previously flat-broached in an endless chain broaching machine, such as I disclose in the prior application, heretofore referred to.

In Figs. 1 and 2 of the drawings, I show my machine as being equipped with about thirty fixtures suitably connected to an endless chain comprising links 15, 16 and 17 and rollers 15a, 16a and 17a and pins 15b, 16b and 17b, which pass over main sprockets 22 and 23 and which sprockets are carried by shaft members 24 and 25, respectively, the shaft members being carried by suitable bearings, comprising parts of an appropriate machine frame 28. The fixture chain is driven by the shaft 25 and this shaft is driven in the direction indicated by the curved arrow by a motor 34 through suitable worm gear reduction mechanism, not shown, but housed at one side of the machine within the machine frame member 36. The mid-section 37 of the machine frame has the top thereof formed to comprise a longitudinally extending fixture slideway, the central section 37 of the machine frame being also provided with a top or bridge portion 38, which constitutes a firm and rigid support for open-faced type of elongated multiple tooth broaching tools 39, which overhang the path of the fixtures 20 as the same are moved through the machine by the action of the sprocket 25 upon the chain carrying the fixtures. Specific description of the machine frame and its cooperative elements will be hereinafter set forth, in connection with a detailed description of one of the fixtures 20.

The fixtures 20 are preferably designed to rotatively carry two pieces of work, instead of one piece, and it will be seen in Figs. 4 to 7, inclusive, that the fixture 20 is provided with two rotatable spindles 40 and 41. The spindle 41 has mounted thereon at the side of the fixture body a sprocket 42, which is engaged by suitable mechanism as the fixture is moved through the mid-section 37 of the machine in endless chain fashion to rotate the spindle 40. Upon the opposite end of the spindle 41 I provide a gear member 43, which drives an intermediate gear 44, suitably mounted at the side of the fixture body, and the intermediate gear 44 drives a companion gear 46 mounted upon the end of the spindle 40. Thus rotation of the spindle 41 also causes rotation of the spindle 40 in the same direction.

The spindles 40 and 41 are provided with clamping devices which serve to clamp the ends of the work piece shown in Fig. 3 in such manner that the flat surface F of the work piece will be precisionally pressed against the flat surface 53 of the spindle and whereby the spindle axis will comprise the axis of the work piece when the work piece is rotated by the spindle, and the clamping means may be such that the clamping and the unclamping of the work may be effected automatically while permitting quick manual loading and gravity discharging of the work piece. In Fig. 6, the work piece is shown in clamped position by the dot and dash lines. The clamping means comprises two opposed bars 50 and 62, which engage the ends of the work piece. The clamping bar 50 is longitudinally slidable on the spindle in a slot 51, and the clamp is maintained in clamping position by a spring member 52 bearing against the end wall of a base formed in the spindle. The clamp bar 50 is shifted to unclamping position (as shown in Fig. 7) by an axially disposed bar member 54, which is actuated by a plunger 56, coaxially mounted upon and protruding from one end of the spindle. The plunger 56 is in splined engagement with the spindle and has a camming head 57 which cooperates with stationary cams mounted on the machine frame and to be hereinafter described and which cams serve to also angularly position the spindle when the spindle is not being rotated, whereby the flat work-supporting face 53 of the spindle will be disposed horizontally and face outward when the fixture in its movement through the machine is at the loading position 60, (see Fig. 2). The second clamp member 62 is mounted upon the spindle to be slidable longitudinally thereon within the slot 58 and this clamp member 62 is actuated by a bearing ball 63. The ball 63 is positioned within a suitable slot formed in the plunger 56 to react against the radial wall of a lug piece 59 fixed on the spindle and the outer tapered end wall of the plunger slot, whereby, when the tapered plunger end 56a is moved inwardly, the ball is urged radially outward on the spindle, thus causing the clamping member 62 to be withdrawn from the work piece simultaneously with the withdrawal of the clamp member 50. A spring 64 serves to maintain the member 62 in an outwardly clamping position when the plunger 56 is in an outward position, as will be obvious.

The fixture body is provided with suitable ball-bearing and roller-bearing mechanisms 66 and 68 respectively for rotatively supporting the spindle and to reduce the spindle friction when the same is rotated.

Rotation of the spindles, when the fixtures are moved through the machine, is effected in the following manner. Mounted upon the machine frame member 37 are spaced apart slide bars 70 and 71, arranged to extend longitudinally of the frame member 37 and in parallel spaced apart relation to provide precision rails which engage right angle disposed surfaces 72 and 73, respectively, formed on the bottom of the fixture. The top of the fixture is provided with a pair of spaced-apart accurately machined and ground plates 76 and 77, which are adapted to be in sliding engagement with a pair of top, spaced-apart parallel extending rails 78 and 79, disposed on opposite sides of the broaching tools 39, and supported by the top machine frame member 38. It will thus be seen that each fixture is provided with six accurately machined parallel surfaces, which slidingly engage the guide rails carried by the machine during that part of the movement of the fixture when a tool cut is being made upon the work carried by the fixture.

In order to obtain the desired rotating speed of the spindles for metal cutting purposes, I provide a spindle-driving means in the form of a horizontally disposed roller chain 80 extending through the mid-section 37—38 of the machine frame adjacent the path of the fixtures and which passes over a pair of sprockets 82 and 81, the latter sprocket being mounted upon a stud shaft 83, mounted upon the machine frame at one side of the fixture path whereby the top stretch of the roller chain 80 will drivingly engage the spindle sprockets 42. The sprocket 82 is mounted upon a shaft 86 which extends into a gear casing 88, and is driven at the desired speed in the direction indicated by the dotted arrows (see Fig. 2) through suitable shafting and gearing arranged within the frame housing 36. This gearing serves to drive a shaft 87 extending longitudinally of the machine frame to a gear reduction means disposed within the gear housing 88, the gear reduction mechanism serving to drive the shaft 86 in a direction to cause the upper stretch of the roller chain 80 to be driven opposite to the direction of movement of the top row of fixtures. In order that the spindle sprockets 42 may pass the sprocket 82 and thereafter engage the roller chain 80, I provide a cam at 89 (see Figs. 2 and 5) which serves to engage depending lugs 20a formed on the bottom of the fixture, whereby the rear end of the fixture is caused to be raised upon reaching the sprocket. In order to permit this swinging upward movement of the fixture, the fixture is attached to the forward chain pin 15b only and the swinging movement of the fixture relative to the chain when passing through the lower part of the machine is determined by the size of the opening 20b. The top stretch of the chain is supported in cooperative relation to the spindle sprockets 42 by a rail 92 fixed to the machine frame.

I will now describe the means for angularly positioning the spindles after the fixtures have passed through the mid-section of the machine, whereby the work may be discharged by gravity and the spindles positioned for the reception of work pieces.

In Figs. 1, 2, 4 and 7 I show an elongated cam member 100, suitably mounted upon the upper part of the machine frame, to lie along the path of movement of the camming head 57 of the spindle plunger 56 before the fixture has reached the chain 80. The surface of the cam 100 and the plunger head 57 are cooperatively such that if the fixture is moved past the position of the cam 100, the spindles are caused to be partly revolved to present the flat sides thereof upwardly or outwardly, thus permitting the manual loading of the work pieces upon the spindle. The cam 100 also serves to cause the clamping members 60 and 62 to be retracted in the manner hereinbefore described, and to remain so to permit sufficient time for said manual loading, and when the fixture passes the end of the cam 100 the plunger 56 is forced outwardly by the spindle spring member 52 and this same action causes the clamping members 50 and 62 to engage and clamp the ends of the work, thus causing the work to be precisioned with the previously machined face F thereof in engagement with the flat surface formed on the spindle. As the fixture is progressed, the spindle sprocket 42 thereof is caused to engage the driving chain 80 in the manner hereinbefore described, and further progression of the fixture along the machine frame will cause the fixture to be accurately slidably engaged by the pairs of rails 70 and 71, and 78 and 79 before the rotating work is brought into engagement with the stationary cutting tool 39. The teeth on the cutting tool 39 are progressively elongated, whereby as the fixtures move from end to end of the mid-section 37 of the machine frame, the cutting operation is effected upon the work in a gradual smooth, accurate and rapid manner.

As the fixture reaches the left-end of the machine, as viewed in Figs. 1 and 2, the camming head 57 of the spindle plunger 56 is brought into engagement with an arcuately formed cam 101, fixed to the machine frame adjacent the path of movement of the head 57 and the shape of the cam 101 is such that the spindles are first revolved to cause the work to be exposed outwardly and thereafter the plunger 56 is forced inwardly, thus causing the clamping members 50 and 62 to be retracted from the work and the work falls by gravity as the fixture is turned over the sprocket 23.

I provide an abundance of cutting lubricant throughout the mid-section 37 of the machine at such force that the work chips are immediately washed into the lower part of the machine frame. This may be accomplished in any well known manner. However, I have particularly arranged the lubricating system whereby I may impart to the lubricating oil, which may also comprise a cutting compound, considerable force to assure both lubrication of the cooperating mechanical parts of the apparatus, as well as a thorough lubrication of the cutting edges of the tools, as the tools act upon the work. I arrange the lubricating system in such manner as to accomplish these two purposes, and I also utilize the lubricating system to subject the fixtures as they move through the lower part of the machine from right to left, as viewed in Fig. 2, to a thorough chip cleaning action. I provide a lubricant pump 120 on the lower part of the machine frame adjacent the oil reservoir at 28a thereof. The pump 120 may be driven in any convenient manner, such as belt drive comprising the belt 122, the pulley 121 on the pump shaft, and a pulley 123 mounted upon the protruding end of the longitudinal shaft 87. A pressure line 124 extends from the pump upwardly to the top of the mid-section frame or bridge member 38, and as will be noted in Fig. 2, this mid-section frame member which supports the tools is of a hollow construction whereby a pressure reservoir 38a is provided throughout the length of the frame member. Downwardly extending openings 38b are provided in the frame member 38, which may extend through the tools, whereby lubricant is impinged upon the work as the work is being acted upon by the tools.

The cleaning action of the lubricant upon the fixtures is effected as the fixtures move through the lower part of the machine from left to right as viewed in Fig. 2, and while the fixtures are inverted. This is effected through a pipe section 126 having suitable perforations 126a extending upwardly. The position of the pipe section 126 is arranged centrally of the fixture path. A thorough chip cleaning action is thus obtained upon the fixtures while they are inverted and moving through the lower end of the machine from left to right, as viewed in Fig. 2.

In Figs. 8 to 12 inclusive of the drawings, I show a form of the fixture mechanism with some modifications of the cooperative cam mechanisms on the machine frame to accomplish both a rotary cut and a straight-line cut on the work piece as the work piece is carried by the fixture through the machine frame. The body of the fixture may be of the same proportioning in this modified form as the hereinbefore described fixture 20, whereby the modified form of fixture may pass through the machine in the manner hereinbefore described in endless chain fashion. Accordingly, only those elements entering into the modification of the fixture 20 for accomplishing both the rotary cuts and the straight line cuts will be described, and like parts of the modified form of fixture 20a will bear the same reference characters.

In this modified form of my invention I also provide a fixture which will afford manual loading of the work pieces to the fixture as the fixture moves in endless chain fashion. The work piece will then be automatically gripped; thereafter the work piece will be revolved while the fixture is moving past the stationary cutting tool; rotating movement of the work is then arrested; the work is then clamped by gripping the turned finished surface thereof in a precision manner. and thereafter further straight line cuts are effected upon the work piece.

A sample of work is shown in Fig. 13, wherein the turned surface is indicated by G and the straight line cut surfaces are indicated at K, J and H.

The machine frame is also provided with a slight rearrangement of the spindle cams and the means for transmitting power from a sprocket chain to the spindle sprocket and an additional means for actuating a fixed clamping means on each fixture, those parts of the fixtures which cooperate with the machine frame being substantially the same.

In Fig. 8 a more or less diagrammatic plan view of the camming arrangement on the machine frame for cooperation with a modified form of fixture is illustrated. In this modified arrangement the cams 100a have the operating faces thereof disposed reverse to the operating surfaces of the cam 100, shown in Fig. 1, for the purpose of releasing the work clamping members 146 and 147 on the spindle structure from the work, (see Fig. 11). This release movement is effected outwardly against the influence of spring members 130 coaxially disposed within the spindle structure, as will be described. The sprocket chain 80a for driving the spindle members is shortened in length but driven in substantially the same manner as shown in Fig. 1; and the cams 101a are also reversed relative to the cams 101, the cams 101a (see Fig. 8) being of considerably greater length to maintain the spindle clamping means inactive, that is, out of engagement with the work, while the work is being carried by fixed clamps on the fixtures during the period the straight line cut is being effected upon the work, as the fixtures move through the machine.

In Figs. 11 and 12 this rearrangement of the spindle mechanism is shown as comprising a pair of oppositely disposed spindle members 132 and 133, suitably rotatably mounted in the frame 20a of the fixture member; the fixture member 20a being properly proportioned to cooperate with the rails 76 and 79 and 70 and 71 of the machine frame in the same manner as the fixture 20, hereinbefore described. The spindle members 132 and 133 are not axially connected but are driven in synchronism by gear members 134 and 135, respectively secured on the outer ends thereof and which gear members are held in synchronous rotation by an auxiliary shaft 138 and gear members 140 and 141 respectively meshing with the spindle gears 134 and 135. The spindle gear member 135 may comprise a sleeve having the sprocket 142a mounted thereon, which sprocket meshes with the chain strip 80a.

It will be noted that the synchronizing shaft 138 is disposed below the spindle axis immediately above the endless chain link connection for the fixtures, whereby considerable clearance is afforded when the spindle clamping heads 146 and 147 are withdrawn from engagement with the work piece W (see Fig. 12), whereby tools 154 of the shape shown in Fig. 12 may be of such contour as to effect finishing cuts over the ends of the work piece as well as straight line cuts on other parts of the work piece.

In order to effect such straight line cuts on the work piece, the work piece must be very firmly non-rotatably clamped. Hence, the clamping means must be such that the work piece may be engaged by the clamping means at the time the work piece is disengaged by the spindle clamping heads 146 and 147 through the action of the cam members 101a, which engage the camming heads 146b and 147b carried by the rods 146c and 147c, comprising parts of the spindle clamping heads 146 and 147, respectively.

The rigid clamping means may comprise a fixed clamping member 165 (Figs. 9 and 10) and a movable clamping member 166, which serve to grip the previously turned surface of the work piece at about the middle portion thereof. The clamping action of the member 166 is effected by a camming rod 167 extending transversely of the fixture to have the central camming part 167a thereof in engagement with the end 166a of the clamping member 166, and the central part 167a of the rod 167 may have a two-stage camming portion 167b formed thereon whereby an initial movement of the clamping member into engagement with the work may be effected and thereafter a hammer blow may be automatically applied to the end 167b of the rod 167. Thus, the work piece may be firmly gripped between the fixed clamp member 165 and movable clamp member 166. Spring member 166b serves to relatively separate the clamp members 165 and 166 when the rod 167 is cammed from right to left of Fig. 12.

A spring latch lever member 168 comprising part of a hammer blow mechanism fixed to the machine frame adjacent the path of the fixtures at 170 (see Fig. 8) serves to act as a clamp closing cam on the rod 167 and to impart a hammer blow thereto. Such a hammer blow mechanism is generally described in the copending application, heretofore referred to.

As the work is carried through the machine, past the cutting tools, and upon completion of the cutting action thereof, the cam member shown at 171 (Fig. 8) serves to engage the end 167d of the rod 167, thus causing the rod to be shifted from the left to the right, as illustrated in Fig. 12, the spring 166b thus serving to force the movable clamp member 166 away from the work, and as the fixtures revolve around the main sprocket shaft 25 the work is thus permitted to fall therefrom by gravity.

It will be apparent to those skilled in the art that my novel apparatus is adaptable to a number of various operations where it is desired to effect turning and straight line cuts upon a piece of work in a precisional and economical manner. It will also be apparent to those skilled in the art that the machine could be adapted to effecting the formation of drill holes or bores in a piece of work, as well as the external operations, hereinbefore described.

What is claimed is:—

1. In a metal cutting machine, the combination of a plurality of non-rotating metal cutting tools, means for supporting the tools, a fixture, a machine frame having a slideway for movably supporting the fixture whereby the fixture may be moved linearly past the positions of the tools, said fixture including a work-supporting spindle and means for rotating said spindle as the fixture is moved past one of said tools whereby a turning cut may be effected upon the work, and means on the fixture for clamping the work rigid relative to the fixture whereby the work will have straight line cuts effected thereon by one of said tools.

2. In a metal cutting machine, the combination of a plurality of stationary cutting tools, a work supporting fixture, means for moving the fixture with the work secured thereon past the cutting tool, said fixture including means to rotatably support the work when moving past one of said tools, and means to non-rotatably support the work when moving past another of said tools, and means for rotating the work, when the fixture is rotatably supported.

3. In a metal cutting machine, the combination of a plurality of metal cutting tools, means for supporting the tools stationary, a fixture, a machine frame having a slideway for movably supporting the fixture whereby the fixture may be moved past the position of the tools, and said fixture including means to both rigidly support and rotatably support the work as the work is moved past one or another of said tools respectively.

4. In an open-faced type of broaching machine, the combination of a stationary multi-cutting edge broaching tool, a series of work-carrying fixtures, means for moving said fixtures past the tool position in endless chain fashion, said fixtures carrying work-supporting rotatable spindles, means for rotating said spindles as the fixtures while carrying the work are moved past the cutting edges of the tool, and means for locking said spindles against rotation whereby the work pieces may be placed upon the spindles as the fixtures move in endless chain fashion.

5. In an open-faced type of broaching machine, the combination of a plurality of stationary multi-cutting edge broaching tools, a series of work-carrying fixtures adapted to be moved past the tool position in endless chain fashion, said fixtures carrying work-supporting rotatable spindles, means for rotating said spindles as the fixtures while carrying work are moved past the cutting edges of the tool, and means for automatically clamping the work to the spindles.

6. In an open-faced type of broaching machine, the combination of a stationary multi-cutting edge broaching tool, a series of work-carrying fixtures, arranged in endless chain fashion, said fixtures carrying work-supporting rotatable spindles, means for rotating said spindles as the fixtures while carrying the work are moved past the cutting edges of one of said tools and means on the fixtures for clamping the work against rotation as the fixtures move past another of said tools, whereby straight line cuts are effected upon the work.

7. In a metal cutting machine, the combination of a plurality of metal cutting tools, means for supporting and for moving a piece of work past the tools to effect successive cuts thereon, including means for rotating the work and for supporting the work non-rotatively as it is being cut by the tools, the axis of rotation being normal to the direction of movement of the work.

8. In a metal cutting machine of the endless fixture chain type, the combination of a plurality of fixtures interconnected in endless chain style, a machine frame having a slideway for the fixtures, a stationary cutting tool supported by the machine frame along said slideway whereby the fixtures may carry work to the tool to effect cuts upon the work, means for driving the fixtures in endless chain fashion, and means disposed along the return path of the fixtures for impinging a cleaning fluid upon the fixtures as they move thereapast to thereby clean the work chips from the fixtures.

9. In a metal cutting machine of the endless fixture chain type, the combination of a plurality of fixtures interconnected in endless chain style, a cutting tool supported by the machine frame and fixtures being adapted to carry work to the tool to effect cuts upon the work, means for driving the fixtures in endless chain fashion, and means disposed along the return path of the fixtures adapted to impinge a cleaning fluid upon the fixtures as they move thereapast and thereby clean work chips from the fixtures.

10. In a metal cutting machine of the endless fixture chain type, the combination of a plurality of fixtures interconnected in endless chain style, a cutting tool supported by the machine frame and the fixtures being adapted to carry work to the tool to effect cuts upon the work, means for driving the fixtures in endless chain fashion, and a fluid conduit disposed along the return path of the fixtures to impinge a cleaning fluid upon the fixtures as they move thereapast and including a fluid reservoir associated with the machine frame and a pump in the system for pumping the fluid from the reservoir to the fixtures.

11. In a metal cutting machine, a frame, a series of workholders supported by said guideway, a spindle rotatably mounted on each workholder, means to intermittently drive said spindles, and means acting during an idle period of said driving means to revolve said spindles to position them in a predetermined position relative to their respective workholders.

12. In a metal cutting machine, a frame, a guideway in said frame, a series of workholders mounted on said guideway, a spindle rotatably mounted on each workholder, means to intermittently drive said spindles, and means acting during an idle period of said driving means to stop said spindles in a predetermined position relative to their respective workholders.

13. In a metal cutting machine, a frame, a guideway in said frame, a series of workholders mounted on said guideway, a spindle rotatably mounted on each workholder, means to drive said spindles, means to intermittently connect said spindles with said driving means, and means acting when said last-named means is disconnected to revolve said spindles to a predetermined position and retain them against rotation.

14. In a metal cutting machine, a frame, a guideway therein, a series of workholders mounted for movement in said guideway, means to progress said workholders through said guideway, each workholder having a spindle rotatably mounted therein, means acting consequent upon the progression of said workholders to rotate said spindles, and means to stop the rotation of said spindles in a predetermined position relative to their respective workholders.

15. In a metal cutting machine, a frame, a guideway therein, a series of workholders mounted for movement in said guideway, means to progress said workholders through said guideway, each workholder including a rotatable work gripping means, means acting consequent upon the progression of said workholders to cause said means to grip workpieces previously positioned in said workholders, means acting consequent upon further progress of said workholders to rotate said gripping means, and means to stop the rotation of said gripping means with the work in a predetermined position relative to the workholders.

16. In a metal cutting machine, a frame, a guideway therein, a series of workholders mounted for movement in said guideway, means to progress said workholders through said guideway, each workholder including a pair of work-gripping members mounted for rotation about a common axis, cam means acting consequent upon the progression of said workholders to cause said gripping members to grip work previously positioned in said workholders, means acting consequent upon further progress of said workholders to rotate said gripping means, and means to stop the rotation of said gripping means with the work gripped thereby in a predetermined position relative to workholders.

17. In a metal cutting machine having a metal cutting tool, a frame, a plurality of workholders carried by said frame and pivotally interconnected to form an endless chain, each workholder including a rigid member and a spindle rotatably mounted in said member, a guideway in said frame for said workholders, means to move said workholders as a unit along said guideway, means carried by said guideway to rotate said spindles, and means to stop the rotation of said spindles in a predetermined position relative to their respective workholders.

18. In a metal cutting machine having a metal cutting tool, a frame, a plurality of workholders carried by said frame and pivotally interconnected to form an endless chain, each workholder including a rigid member and a spindle rotatably mounted in said member, a guideway in said frame for said workholders, means to move said workholders as a unit along said guideway, power means carried by said guideway to intermittently rotate said spindles, and independent means acting during an idle period of said last-named means to rotate said spindles to a predetermined position and thereafter restrain said spindles against rotation until said power means again is operatively connected to rotate said spindles.

19. In a metal cutting machine having a metal cutting tool, a frame, a plurality of workholders carried by said frame and pivotally interconnected to form an endless chain, each workholder including a rigid member and a spindle rotatably mounted in said member, a guideway in said frame for said workholders, means to move said workholders as a unit along said guideway, means carried by said guideway to periodically rotate said spindles, and means acting thereafter to stop the rotation of said spindles at a predetermined position of revolution about their axis.

20. In a metal cutting machine, a frame, a guideway in said frame, a plurality of workholders movably mounted in said guideway and connected together to form an endless chain, means to progress said chain along said guideway, a spindle rotatably mounted in each workholder, means carried by said frame to rotate said spindles, means carried by each workholder to cause workpieces placed thereon to be automatically clamped on their respective spindles, and means acting thereafter to automatically cause said rotary means to become effective to rotate the spindles, means to disengage said rotary means from said spindles, and an independent means to revolve said spindles after said rotary means has been disengaged therefrom to position a predetermined portion thereof in a predetermined relation to their respective workholders.

BERNARD P. SCHILTZ.